Patented Aug. 6, 1929.

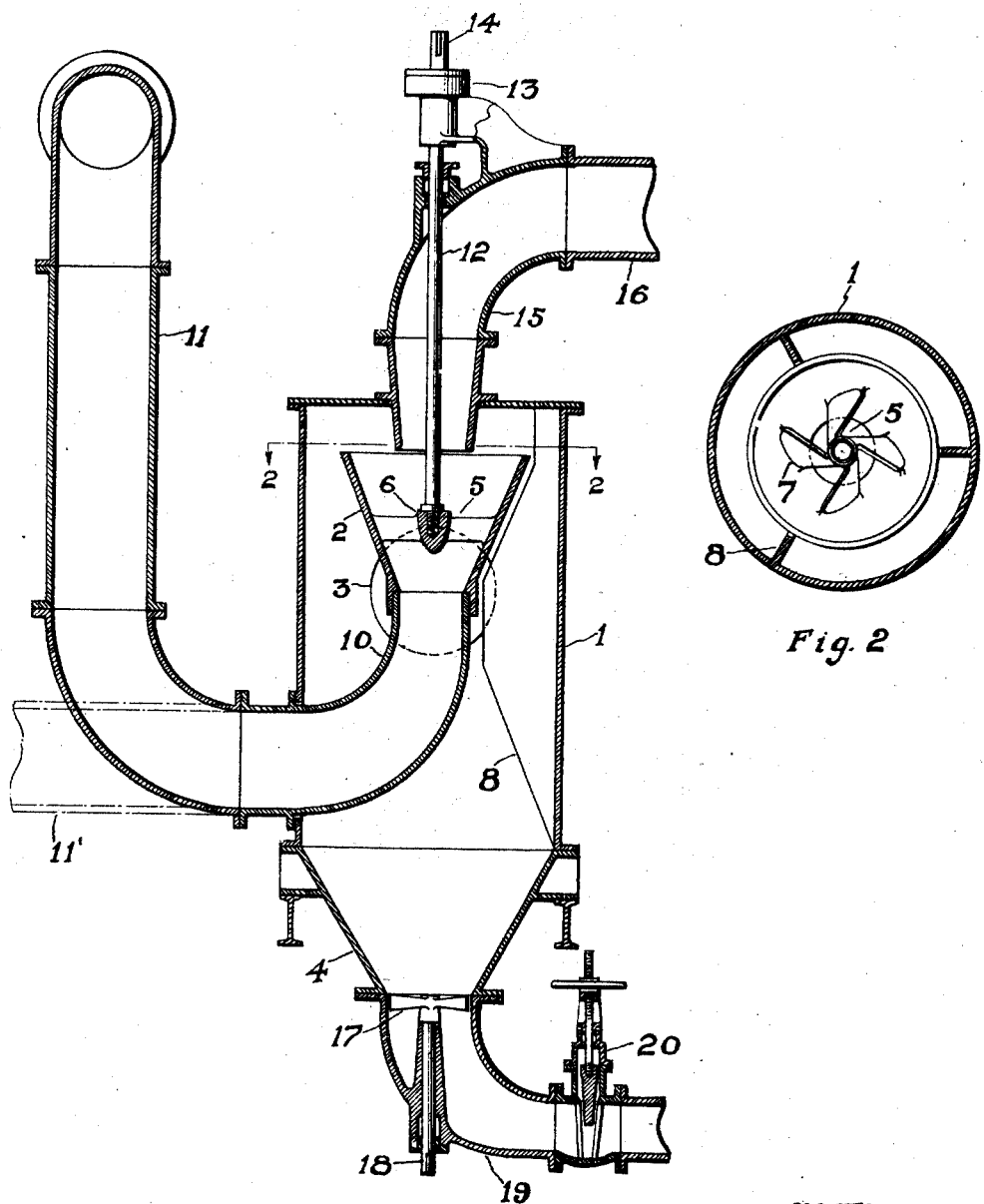

1,723,495

UNITED STATES PATENT OFFICE.

THEODOR TOHLIN, OF PHILADELPHIA, PENNSYLVANIA.

CENTRIFUGAL SEPARATOR.

Application filed January 25, 1928. Serial No. 249,372.

This invention relates to a machine particularly designed for separating sewage from water by means of centrifugal action, though it will readily be understood that my device can in general be used wherever it is desired to separate the lighter from the heavier constituents of liquids or semi-liquids, as for example in the separation of pulp fibers from water, or in the concentration of ores.

It is the general object of my invention to provide a machine by means of which the separation of solid from liquid is carried out as a continuous operation, with a very great reduction in the time and attention required on the part of the operator.

A further object is to provide a separating device wherein the revolving bowl or separator is in the form of an inverted cone, or frustum of a cone, so that the solids which it is desired to separate are of necessity forced to the upper circumference of the bowl. This object is aided in some measure by having the inlet for the raw liquor at the lower end of the bowl, though, of course, it is possible to reverse the direction of flow of the liquor without departing from the purview of my invention.

With these and other objects in view, important though not indispensable features of my invention relate to the provision of a propeller contained within the rotating separating bowl which acts as a screw pump in case the liquor is fed into the bowl under very little or no head, in the provision of vertical baffle plates outside the bowl to prevent rotation of the separated mass and in the provision of a discharge propeller to disintegrate and break up the discharged solids and thus prevent clogging up of the discharge pipes. Any or all of these last mentioned elements may be omitted without in any way detracting from the breadth or scope of my invention, or sacrificing the advantages of forcing the solids to the upper periphery of the bowl.

My invention further relates to arrangements and combinations of parts which will be hereinafter set forth and more particularly pointed out in the appended claims.

I have illustrated the invention in the accompanying drawing in which Figure 1 is a diagrammatic vertical cross-section through a preferred form of my device, and Figure 2 is a cross-section on the line 2—2 of Figure 1, looking in the direction of the arrows.

In the drawing, my simplified device is illustrated as comprising a casing 1 which houses the separating bowl 2. Though the casing 1 is illustrated rather conventionally and with a handhole 3 for access to the working parts of the device, it is obvious that the casing may be made of any suitable metal with or without a handhole or of glass or other transparent material so that the operation of the device can be kept under constant observation.

The bowl 2 is preferably substantially conical or frusto conical in shape as such a shape appears to be of the greatest efficacy in causing the heavy part of the liquid to be forced up and out toward the upper circumference of the bowl and overflow into the discharge end 4 of the apparatus.

Either cast on or suitably fastened to the inner surface of the bowl is a propeller 5 having a hub 6 and blades 7. Around the inner surface of the casing 1 is suitably fastened a series of baffle plates 8 which break up the mass of separated material and prevent it from rotating with the bowl.

The lower or narrower end of the bowl is fitted with suitable packing or sealing rings (not shown) and rotates over the discharge end 10 of the intake 11 or alternate intake 11' for raw liquor.

Fastened to the hub of the propeller and rising vertically therefrom is a rotatable shaft 12 supported by a thrust bearing 13 and provided at its upper end with a pulley drive or other suitable rotating means 14. The shaft 12 is shown as passing upwardly through the elbow 15 of the clarified liquid outlet 16, but it is obvious that the shaft might just as well extend downwardly through the inlet elbow 10, in which case the propeller 5 might be connected to the discharge propeller 17 and rotate therewith as a unit.

The clarified liquid outlet 16 extends upwardly from the mouth of the centrifugal bowl 2 and may be supported in any suitable manner upon the casing or housing 1.

The discharge end 4 of the apparatus is also preferably conical or frusto-conical in shape and may be provided at its throat portion with a propeller 17 to disintegrate and break up the separated materials so that they will not clog the outlet. The propeller 17 may be rotated in a manner similar to the propeller 5, or the two propellers may be connected for simultaneous rotation.

The raw liquor may be supplied to the separating bowl under a head as by means of the intake 11 or under no head at all as by means of the alternate intake 11' in which latter case the apparatus must be primed. The priming is accomplished by keeping the valve 20 closed during the operation of the device until the casing 1 and the discharge 4 are filled with liquor. In such case, the propeller 5 acts as a screw pump to suck the raw liquor up into the separating bowl. The discharge valve can also be regulated to set up a back pressure and thus cause the propeller 5 to force the clarified liquor out through the outlet.

While in order to comply with the statutes, the invention has been described in language more or less specific as to certain structural features, it is to be understood that the invention is not limited to any specific details, but that the means and construction herein described comprises but one mode of putting the invention into effect, and the invention is therefore claimed broadly in any of its possible forms or modifications within the scope of the appended claims.

I claim:

1. In a separator of the type described, a vertical shaft, a propeller connected to the lower end of said shaft, a rotary separating bowl connected at substantially its midportion to the outer periphery of said propeller and housing said propeller, said bowl being frusto-conical in shape with its wider end uppermost, an intake for raw liquor in alinement with the lower end of said bowl and an outlet for clarified liquor rising upwardly from the central zone of the wider end of said bowl, said outlet being substantially in alinement with both the intake and the lower end of said bowl.

2. In a separator as defined in claim 1, wherein all but a portion of said vertical shaft is housed within said clarified liquor outlet.

3. In a separator as defined in claim 1 wherein said bowl is rotatably mounted on the upper end of said raw liquor intake.

4. A separator of the type described comprising a vertical shaft, a propeller connected to the lower end of said shaft, a rotary separating bowl connected at substantially its midportion to the outer periphery of said propeller and completely housing said propeller, said bowl having both a narrow and a wide end, the narrow end being downwardly disposed, an intake for raw liquor in alinement with the narrow end of said bowl, an outlet for clarified liquor rising upwardly from the central zone of the wide end of said bowl, said outlet being substantially in alinement with both the intake and the narrow end of said bowl and a casing surrounding the rotary bowl, the lower end of the clarified liquor outlet and the upper end of the raw liquor intake.

5. In a separator as defined in claim 4 wherein the separating bowl is rotatably mounted on the upper end of the said raw liquor intake.

6. In a separator of the type set forth, an intake for raw liquor having an upper end, a separating bowl rotatably mounted on said upper end, means to rotate said bowl and means to carry off the clarified liquor.

7. In a separator of the type set forth, an intake for raw liquor, an outlet for clarified liquor rising vertically above said intake with its lower end spaced from the upper end of said intake and in substantial alinement therewith and a separating bowl mounted for rotation on the upper end of said intake.

8. In a separator as set forth in claim 6 wherein the separating bowl is frusto-conical in shape with its wider end uppermost.

9. In a separator as set forth in claim 6 wherein the means to carry off the clarified liquor is located above the central zone of the upper end of the said separating bowl.

10. In a separator of the type set forth, a vertical shaft, an intake for raw liquor with its upper end below the lower end of said shaft, a separating bowl suspended from the lower end of said shaft and rotatably mounted upon the upper end of said raw liquor intake and means to carry off the clarified liquor from said separating bowl.

11. In a separator as defined in claim 10, wherein said means to carry off the clarified liquor is located above the central zone of the upper end of said separating bowl.

12. In a separator as defined in claim 10 wherein a casing encloses the separating bowl as well as the lower end of the outlet for the clarified liquor and the upper end of the raw liquor intake.

In testimony whereof I affix my signature.

THEODOR TOHLIN.